US011443521B2

United States Patent
Ortiz Cuesta et al.

(10) Patent No.: US 11,443,521 B2
(45) Date of Patent: Sep. 13, 2022

(54) METHOD AND DEVICE FOR EVALUATING IMAGES, OPERATIONAL ASSISTANCE METHOD AND OPERATING DEVICE

(71) Applicant: Robert Bosch GmbH, Stuttgart (DE)

(72) Inventors: Fernando Ortiz Cuesta, Hannover (DE); Stephan Simon, Sibbesse (DE); Arne Zender, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 16/645,596

(22) PCT Filed: Aug. 21, 2018

(86) PCT No.: PCT/EP2018/072504
§ 371 (c)(1),
(2) Date: Mar. 9, 2020

(87) PCT Pub. No.: WO2019/052786
PCT Pub. Date: Mar. 21, 2019

(65) Prior Publication Data
US 2021/0365691 A1 Nov. 25, 2021

(30) Foreign Application Priority Data
Sep. 12, 2017 (DE) .......................... 102017216065.9

(51) Int. Cl.
*G06V 20/56* (2022.01)
*G06T 1/20* (2006.01)
(Continued)

(52) U.S. Cl.
CPC ............... *G06V 20/56* (2022.01); *G06T 1/20* (2013.01); *G06V 10/507* (2022.01); *B60T 7/12* (2013.01)

(58) Field of Classification Search
None
See application file for complete search history.

(56) References Cited

U.S. PATENT DOCUMENTS

| 2007/0121998 A1* | 5/2007 | Stein | G06V 10/36 |
| | | | 382/218 |
| 2014/0029857 A1* | 1/2014 | Kompalli | G06V 30/413 |
| | | | 382/212 |

(Continued)

FOREIGN PATENT DOCUMENTS

| DE | 10351778 A1 | 6/2005 |
| DE | 102012023060 A1 | 6/2014 |

(Continued)

OTHER PUBLICATIONS

International Search Report for PCT/EP2018/072504, dated Jan. 4, 2019.

(Continued)

*Primary Examiner* — Leon Viet Q Nguyen
(74) *Attorney, Agent, or Firm* — Norton Rose Fulbright US LLP; Gerard Messina

(57) ABSTRACT

A method for evaluating images and, in particular, for evaluating correspondence hypotheses of images. The method includes (i) providing a hypothesis matrix of correspondence hypotheses between first and second images, each given as a corresponding image matrix, (ii) evaluating the hypothesis matrix and conditional verification of the image correspondence hypotheses and (iii) providing verified image correspondence hypotheses in a correspondence matrix of image correspondences as the evaluation result, the hypothesis matrix being evaluated by forming and evaluating a histogram with respect to the values of the component for each element of the hypothesis matrix for at least one component of correspondence hypotheses.

13 Claims, 10 Drawing Sheets

(51) Int. Cl.
*G06V 10/50* (2022.01)
*B60T 7/12* (2006.01)

(56) References Cited

U.S. PATENT DOCUMENTS

| | | | |
|---|---|---|---|
| 2015/0131902 A1* | 5/2015 | Arnone | H04N 1/6086 |
| | | | 382/165 |
| 2015/0217765 A1 | 8/2015 | Tokoro | |
| 2016/0232654 A1* | 8/2016 | Suzuki | B25J 9/1697 |
| 2019/0095694 A1* | 3/2019 | Waizenegger | G06V 20/653 |

FOREIGN PATENT DOCUMENTS

| | | |
|---|---|---|
| DE | 102016219368 A1 | 4/2017 |
| EP | 1117251 A1 | 7/2001 |
| JP | H031787 A | 1/1991 |
| JP | 2015148899 A | 8/2015 |
| JP | 2016514867 A | 5/2016 |
| WO | 2012137214 A1 | 10/2012 |
| WO | 2015110331 A1 | 7/2015 |

OTHER PUBLICATIONS

Gregory Cox et al., "A Linear Image-Pair Model and the Associated Hypothesis Test for Matching," In: "Serious Games", Springer International Publishing, Cham, 2002, pp. 61-69, XP55536278.

* cited by examiner

METHOD AND DEVICE FOR EVALUATING IMAGES, OPERATIONAL ASSISTANCE METHOD AND OPERATING DEVICE

FIELD

The present invention relates to a method and a device for evaluating images and, in particular, correspondence hypotheses of images, an operational assistance method and, in particular, a driver assistance method, as well as an operating device and, in particular, a vehicle. The present invention also relates to a computer program and to a machine-readable memory medium.

BACKGROUND INFORMATION

Image processing is used in many technical fields for controlling devices and processes, for example, also in the automotive industry in so-called driver assistance systems. In this context, images are captured, for example, and used as a basis for a control process. For this purpose, the images must be evaluated. When evaluating images, so-called correspondences are frequently generated and used as a basis for the evaluation. Such correspondences describe assignments between coordinates in a first image and coordinates in a second image pixel-by-pixel and in a temporal and/or spatial direction. A temporal relationship may be images recorded in succession, a spatial relationship may be spatially separated images, which may also be recorded simultaneously, for example, in stereo vision. When deriving correspondences, correspondence hypotheses are initially formed. The correspondence hypotheses must be verified or falsified. This process is memory-intensive, computationally-intensive and/or time-intensive, in particular, in the case of high-resolution images.

SUMMARY

A example method for evaluating images according to the present invention may have the advantage over the related art that with comparatively little effort correspondence hypotheses for a pair of image may be verified, i.e., confirmed or rejected with a high degree of reliability. This may be achieved according to the present invention. In accordance with and example embodiment of the present invention a method for evaluating images and, in particular, for evaluating correspondence hypotheses of images is provided, which includes the steps:
(i) providing correspondence hypotheses between first and second images each given as a corresponding image matrix as elements in a corresponding hypothesis matrix,
(ii) evaluating the hypothesis matrix and conditionally verifying the correspondence hypotheses and
(iii) providing verified image correspondence hypotheses as image correspondences in a correspondence matrix as an evaluation result.

The hypothesis matrix is evaluated according to the present invention by forming and evaluating a histogram for each element as a reference element of the hypothesis matrix in the surroundings of the respective element for at least one component of the correspondence hypotheses. The result of these measures according to the present invention is that hypotheses for elements or pixels of the underlying images may be evaluated via their surroundings in the image or in the matrix of the correspondence hypotheses and consequently with a high degree of reliability and, thus verified or falsified.

In this case, the present invention exploits the fact that a correct correspondence in the hypothesis image is confirmed by correspondences in the vicinity, because they are similar in value, i.e., for example, with respect to direction or length, whereas false correspondences do not exhibit this similarity. With the approach according to the present invention, a reliable and efficient evaluation and separation of the correct and of the false correspondences is effectuated.

In this context, "conditional verification" in the broader sense means that when checking one or multiple predefined condition(s), it is decided according to the present invention whether a respective correspondence hypothesis is confirmed and maintained, i.e., verified in the narrower sense, or else denied or rejected, i.e., is falsified.

The present invention is applicable in connection with any form of cameras, monitoring cameras and/or metrology cameras, for example,—but not only—on or in vehicles in general, in particular, in connection with motor vehicles. Also included in this case are applications of the present invention in connection with television cameras, consumer cameras, drone cameras, human-machine interaction cameras, etc.

Preferred refinements of the present invention are described herein.

The totality of the correspondence hypotheses are also understood within the context of the present invention as a hypothesis image or hypothesis matrix, the individual components thereof are also referred to as elements or pixels. The individual correspondence hypotheses may include one or also multiple scalar component(s), for example, values for various movement directions u, v in the hypothesis image and/or in a projection plane in the underlying space. Thus, they may be vector-valued. Furthermore, the correspondence hypotheses may also be based on the concept of the optical flow, also referred to as OF, and/or reflect a stereo disparity, but this is not mandatory.

The structure of one or of multiple histograms with respect to the hypothesis matrix may be implemented in various ways.

In one preferred specific embodiment of the method according to the present invention, a histogram for a given respective element of the hypothesis matrix is formed by classifying, and summing or summing in a weighted manner the respective components of the correspondence hypotheses in a given histogram classification for—in particular, all—elements of the hypothesis matrix in the interior of the surroundings of the given element.

In this case, it is not mandatory that all elements of the hypothesis matrix encompassed by the respective surroundings of each given element of the hypothesis matrix are evaluated or even considered, i.e., for example, read out, for forming the histogram. Instead, it is possible as a function of the respective application and situation to make a suitable choice, for example, in order to accelerate the method according to the present invention or in order to reduce the computing time. This is further explained in detail below.

The surroundings for a given respective element of the hypothesis matrix may be defined by different means.

The method according to the present invention is particularly flexibly structured if according to one preferred refinement, when forming a respective histogram, the surroundings for a given respective element of the hypothesis matrix are provided in each case with a window wholly or partially overlaying the hypothesis matrix, in particular, in the manner of a rectangle, a polygon, an oval, an ellipsis or a circle.

The given, respective element of the hypothesis matrix described in this context virtually forms a reference element or reference pixel. This reference element or reference pixel is assigned the respectively generated histogram and is evaluated for this histogram.

The method according to the present invention operates particularly reliably when all elements of the hypothesis matrix are captured during the evaluation and, in particular, during the formation of histograms.

In this case, it is advantageous if the respective surroundings or a respective window is used, which is identical or similar for all elements of the hypothesis matrix with respect to form and/or extent, because a high degree of comparability of the results for various elements of the hypothesis matrix occurs under these circumstances.

In order to save time-critical or computationally-intensive or memory access-intensive working steps for the purpose of sequence optimization with respect to the operational sequence of the method according to the present invention, it is provided in another advantageous refinement that respective surroundings or a respective window are designed as sliding surroundings or as a sliding window. In the application, this means that the sliding window is placed as an ideal construct above the hypothesis matrix where it is shifted, in order to establish the respective reference element and the surroundings that are to be used for calculating the histogram. The sliding movement of the window then takes place stepwise, for example, stepwise in the row direction column by column or in the column direction row by row, an existing histogram then being updated for a new reference element, namely by adding or entering newly arriving elements of the hypothesis matrix and omitting or removing discontinued elements of the hypothesis matrix.

When evaluating a histogram for a given respective element as a reference element of the hypothesis matrix, an evaluation value may be generated based on the histogram. This value is then used as the actual evaluation of the correspondence hypothesis belonging to the reference element or reference pixel.

The evaluation value may be generated, for example, by reading out one or multiple value(s) of the histogram in at least one histogram interval for the correspondence hypothesis assigned to the given element or for at least one component thereof and by summing them or summing them in a weighted manner to form the evaluation value.

In the process, one or multiple values from one or from multiple adjacent histogram interval(s) assigned to the histogram interval or from the surroundings of adjacent histogram intervals may preferably also be taken into consideration. In this way, it is possible to easily take the hypothesis surroundings for the correspondence hypothesis of the reference pixel into consideration, in order to verify or to falsify the correspondence hypothesis of the reference pixel.

In another advantageous refinement of the method according to the present invention, it is detected when verifying a verification of a correspondence hypothesis for a respective given element as a reference element of the hypothesis matrix or for a component thereof, when the evaluation value at least reaches a local or global predefined threshold value. This means specifically that it is checked whether the evaluation value for the correspondence hypothesis of the reference pixel is below or above a threshold value or at least reaches this value. In the first case, the correspondence hypothesis is rejected as an outlier, in the latter case, it is verified, confirmed and then adopted directly or in modified form as correspondence into the correspondence matrix or into the correspondence image.

Alternatively or in addition, it may be provided that when verifying a correspondence hypothesis for a respectively given element as a reference element or reference pixel of the hypothesis matrix or for a component thereof, an assigned and verified correspondence or a component thereof is established in each case by an evaluation value and as such is preferably entered as a corresponding element into the correspondence matrix or into the correspondence image.

In specific embodiments, various technical measures may be taken in order to accelerate the method according to the present invention during the execution and/or to reduce the processing effort required in each case.

This may also be understood to mean, in particular, that the number of operations is reduced, for example, the number of memory accesses, of additions and/or of multiplications. This may be utilized for a temporal acceleration in terms of a more rapid implementation for reducing the resources provided for the implementation or for both simultaneously.

It is therefore particularly advantageous if, according to one embodiment of the method according to the present invention for accelerating the evaluation of the hypothesis matrix and/or of the conditional verification of the correspondence hypotheses, a respectively instantaneously generated histogram, which is stored, in particular, in a histogram memory, is used for the parallel and/or serial verification of multiple correspondence hypotheses, in particular, for evaluating correspondence hypotheses of a plurality of elements of the hypothesis matrix as reference elements or as reference pixels of the hypothesis matrix which, in particular, may be directly adjacent to one another.

In this context, it is also advantageous if according to another embodiment of the method according to the present invention, a histogram memory used is organized in such a way that an underlying clock cycle of the processing is sufficient in order to read out the value for a respectively updated element as a reference element of the hypothesis matrix from the histogram, as well as values for one or for multiple additional interval(s) of the histogram.

This may advantageously take place by (i) calculating an underlying read address by adding or subtracting the value 1 with respect to the value for the updated element stored in the hypothesis matrix and/or (ii) by clustering intervals of the histogram, in particular, with respect to a dual port of the underlying histogram memory.

Alternatively or in addition, it is possible for accelerating the evaluation of the hypothesis matrix and/or the conditional verification of the correspondence hypotheses, to carry out the conditional verification in parallel, in particular, simultaneously, and/or serially for a plurality of correspondence hypotheses for a corresponding plurality of elements in terms of reference elements of the hypothesis matrix.

A given filling state of a histogram may be utilized in order to verify multiple hypotheses—namely for the reference position in the hypothesis image and for close neighbors. Since the updating of the histogram is complex and the number of the required updates may be reduced with this process—for example, to ¼—the result is a savings in the processing effort, for example, in terms of the number of memory accesses, additions, weightings and the like.

It is also possible that not all elements of the hypothesis matrix in the interior of the surroundings of the respectively given element are taken into consideration as a reference element of the hypothesis matrix and, in particular, of the underlying sliding window when updating a histogram.

In this case, for example, it is possible to use fewer rows than is equivalent to the maximum row number of the sliding window, in particular, using a row number of 4.

The present invention further relates to an operational assistance method and, in particular, to a driver assistance method for a device and, in particular, for a vehicle, in which images are captured and are evaluated using a method according to the present invention, and in which a result of the evaluation is used in controlling the operation of the device.

According to another aspect of the present invention, an example device for evaluating images and, in particular, for evaluating correspondence hypotheses of images is also specified, which is configured to carry out an operational assistance method or driver assistance method according to the present invention or a method according to the present invention for evaluating images and, in particular, correspondence hypotheses for image pairs.

The device according to the present invention may be designed, in particular, as an ASIC, as a freely programmable digital signal processing device or as a combination thereof.

In addition, a computer program is also specified by the present invention, which is configured to carry out a method according to the present invention when it is executed on a computer or on a digital signal processing unit.

Furthermore, the present invention also provides a machine-readable memory medium on which the computer program according to the present invention is stored.

BRIEF DESCRIPTION OF THE DRAWINGS

Specific embodiments of the present invention are described in detail with reference to the figures.

DETAILED DESCRIPTION OF EXAMPLE EMBODIMENTS

Figure 1:
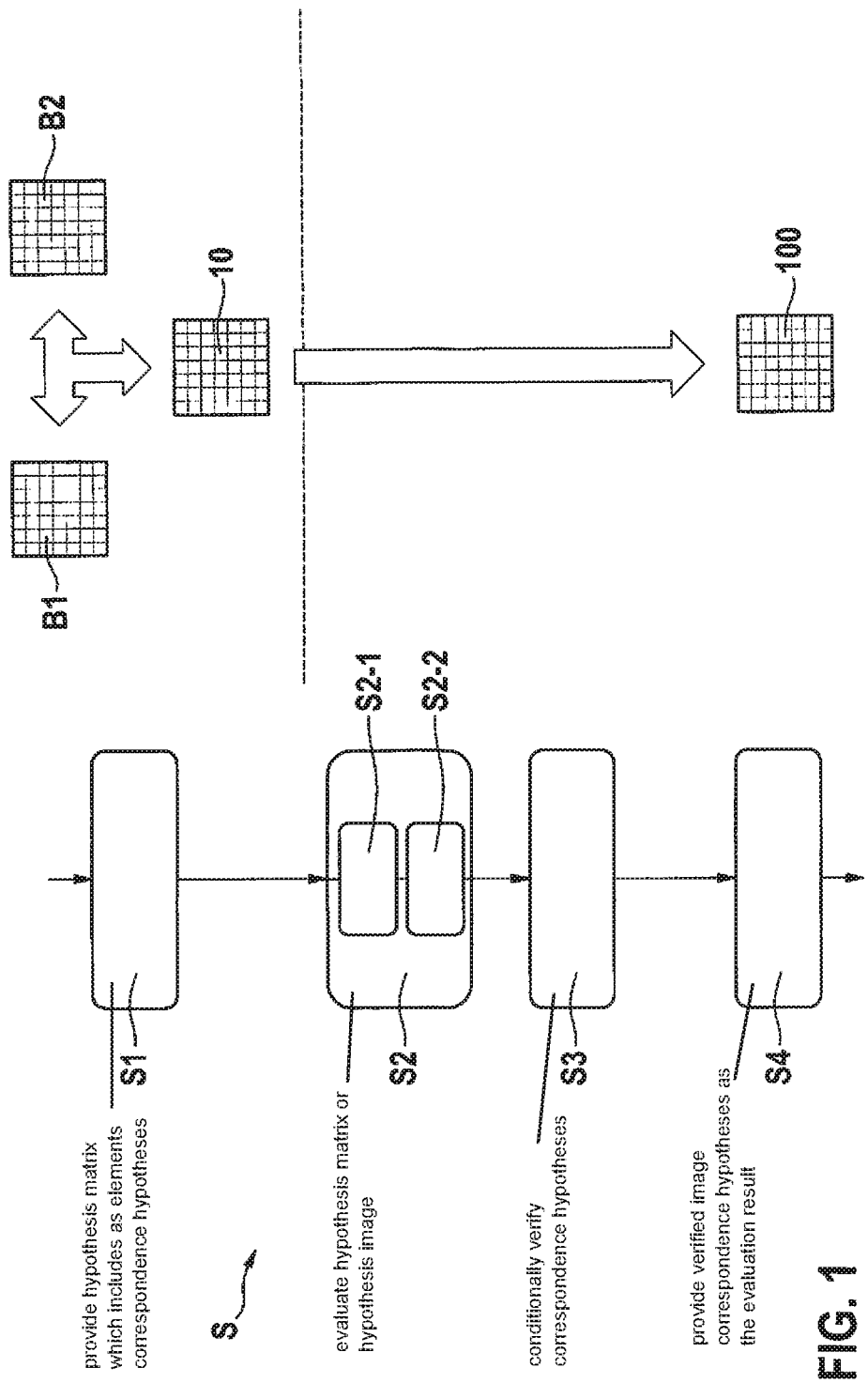
FIG. 1 schematically shows one specific embodiment of the method according to the present invention in the form of a flow chart and illustrates the correspondence between the underlying images, the hypothesis matrix and the correspondence matrix.

Exemplary embodiments of the present invention and of the technical background are described in detail below with reference to FIGS. 1 through 10. Identical and equivalent elements and components, as well as elements and components acting identically or equivalently, are identified with the same reference numeral. The detailed description of the identified elements and components is not rendered each time they occur.

The features and additional properties depicted may be isolated from one another in arbitrary form and may be arbitrarily combined with one another, without departing from the core of the present invention.

FIG. 1 schematically shows one specific embodiment of the method S according to the present invention for evaluating images B1 and B2 in the form of a flow chart and illustrates the correspondence between underlying images B1, B2 of hypothesis matrix 10 and of correspondence matrix 100.

In a first step S1 of method S according to the present invention for evaluating images B1 and B2, a hypothesis matrix 10 is initially provided, which may also be understood to be a hypothesis image and includes as elements correspondence hypotheses [u, v]—here with components u and v—, which are to be evaluated in order to decide whether a respective correspondence hypothesis actually results in a correspondence or must be rejected as an outlier.

In this case, [u, v] may be understood to be a vector, whose components u and v each have the unit pixel. Such a vector [u, v] may be added to or subtracted from a vector [x, y]. Vector [x, y] in this case may represent a position (as a pixel coordinate) in image B1 or B2. The sum [x, y]+[u, v] or the difference [x, y]−[u, v] may represent a position in the respectively other image. Thus, a vector [u, v] at a position [x, y] represents a relationship in terms of an assignment to a position in the respectively other image. This relationship may correspond to a correspondence: this is the case if the same scene point is represented at both image positions. The point is to find such correct correspondences. In the event of confirmation, [u, v] is stored at the position of [x, y] in correspondence matrix 100 and is identified as valid. In the event of the rejection, this is noted accordingly at the position of [x, y]. To identify as valid/invalid, one bit per position [x, y] may be provided or a specific vector [u, v], which is situated at the edge of the value range of u and v.

A vector [u, v] generally does not include integer values. Vector [x, y] on the other hand preferably includes integer values.

To decide whether or not a correspondence hypothesis is to be evaluated as an outlier, hypothesis matrix 10 or the hypothesis image are evaluated in a second step S2 and verified in a subsequent step S3 on the basis of an evaluation result. This means, in particular, that for each correspondence hypothesis [u, v] or for each of the components u and v, it is decided whether the correspondence hypothesis [u, v] or component u, v is rejected and denied or is confirmed.

The totality of all confirmed correspondence hypotheses [u, v] then forms corresponding correspondence matrix 100, which may also be referred to as a correspondence image and which contains the confirmed correspondence as elements or pixels.

According to the present invention, evaluation S2 of hypothesis matrix 10 takes place by forming in a step S2-1, for each element 1 of hypothesis matrix 10, functioning here as a so-called reference element or reference pixel, one or multiple histogram(s) 63, 64 for a respective assigned correspondence hypothesis [u, v] or for components u, v which form the correspondence hypothesis with respect to the values of components u, v of correspondence hypothesis [u, v].

These histograms 63, 64 are then evaluated in a subsequent step S2-2.

FIG. 1 also shows that images B1, B2, hypothesis matrix 10, also understood to be a hypothesis image, and correspondence matrix 100, also understood to be a correspondence image, may each be represented as matrices corresponding to one another and/or as correspondingly configured memories or memory areas. This serves as a simplified representation, but is not mandatory as long as the respective 1-to-1 correspondence between at least one of images B1, B2, of hypothesis matrix 10 and of correspondence matrix 100 and their respective components or pixels may be established.

FIGS. 2 through 5 schematically illustrate possible connections between an underlying hypothesis matrix 10 and an applied sliding window 20, which defines or forms the surroundings for eliciting a histogram 63, 64 for a respectively given reference pixel 1.

In all specific embodiments depicted in FIGS. 2 through 5, the totality of correspondence hypotheses [u, v] is represented as rectangular hypothesis matrix 10 including a particular number of columns and a particular number of rows. Hypothesis matrix 10 may also be understood to be a hypothesis image and includes elements 11, which may also be referred to as pixels. Thus, each element 11 of hypothesis matrix 10 includes a correspondence hypothesis [u, v], which may be made up of one component or, as here, of a plurality of components u, v.

In this case, however, not every correspondence hypothesis [u, v] must have a valid content, because it is possible, for example, that no hypothesis was able to be determined for a particular image position, for example, because the respective scene point is visible in image B1, but is concealed in image B2 or is undiscoverable for other reasons.

It is therefore provided that a piece of valid/invalid information may be specified for each memory location of hypothesis matrix 10. To identify as valid/invalid, one bit per position [x, y] may be provided or a specific vector [u, v], which is situated, for example, at the edge of the value range of u and v.

Hypotheses identified as invalid are subsequently consistently ignored. Hence, they have no influence on histograms 63, 64. A hypothesis identified as invalid also cannot lead to a result in correspondence matrix 100.

The type of correspondence hypotheses [u, v] and their components u, v, is a function of the underlying method S1 of providing correspondence hypotheses [u, v]. This includes the physical nature of the underlying captured images B1 and B2 and the nature of the mechanisms themselves for forming correspondences. Thus, the correspondence formation may be based on a concept of the optical flow (OF) and/or on aspects of the stereo disparity and optionally other aspects.

In the examples shown in FIGS. 2 through 5, the respective surroundings of a reference pixel 1 of underlying hypothesis matrix 10 is provided by a sliding window 20 having a width B and a height H, including corresponding numbers of columns and rows. Sliding window 20 covers in each case an area 15 of hypothesis image 10 and includes corresponding elements 21, which may also be referred to as pixels. An element in this case, which is identified with 1 or 26, is marked and serves as a reference pixel or as a reference element 1, 26 in relation to sliding window 20. Reference element or reference pixel 1, 26 may be a central pixel in relation to the window.

Histograms 63, 64 described below are always ascertained on the basis of sliding window 20 and of area 15 of elements 11, 21 of underlying hypothesis matrix 10 covered by sliding window 20.

Histograms 63, 64 to be described below are advantageously updated by a sliding displacement, for example, along the row direction, i.e. horizontally in the direction of arrow 23 in FIGS. 2 through 5. During this sliding movement, i.e., during the displacement, the pixels or elements 24 of hypothesis matrix 10 drop out of sliding window 20 on the left side or rear side 17, whereas pixels 22 reach under or into sliding window 20 on the right side, which is also referred to as front side 16.

A histogram 63, 64 is updated by removing departing pixels 24 and closing out their counters or weights from histogram 63, 64 and by registering the counters or weights of incoming pixels 22 into histogram 63, 64.

Figure 2:
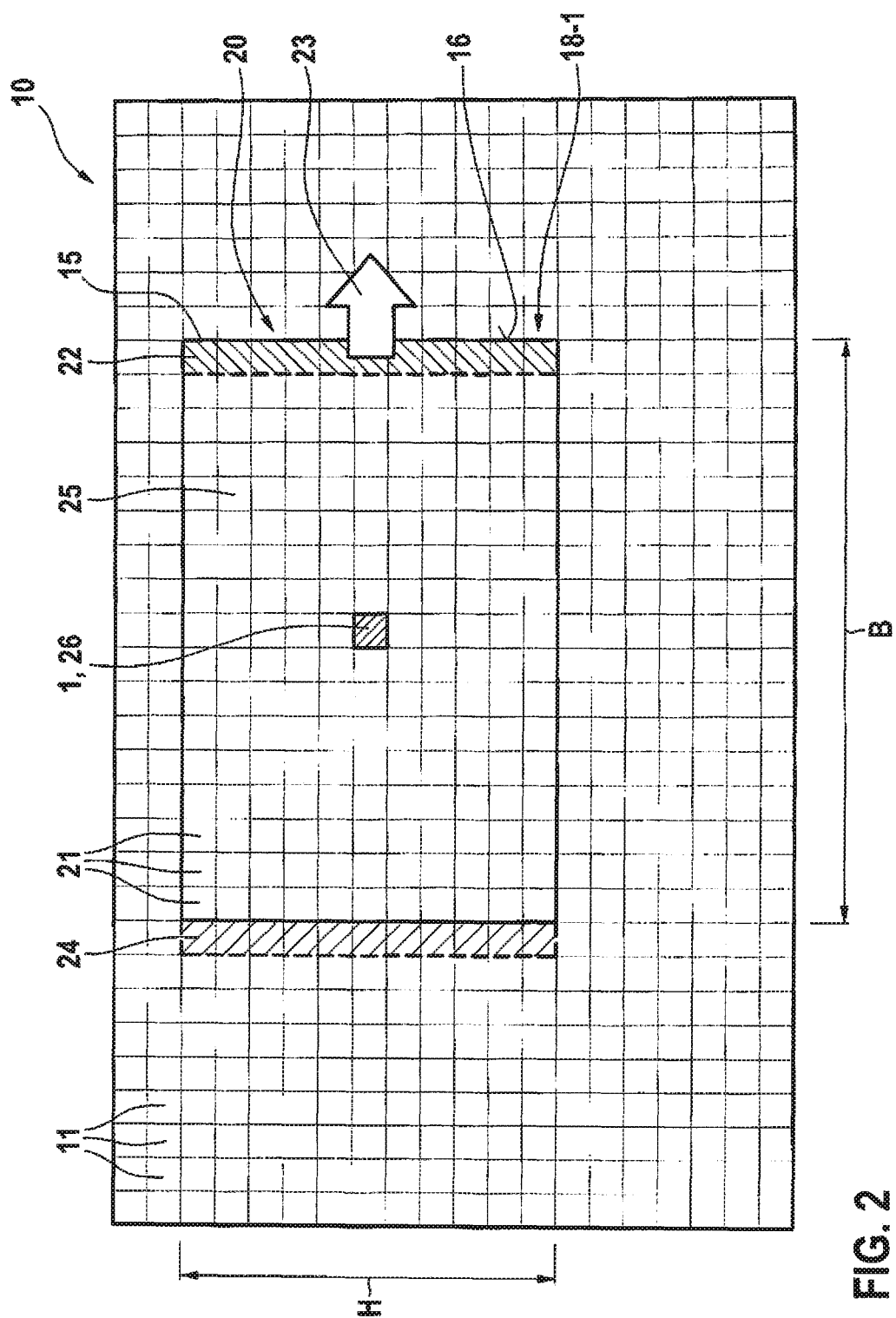
FIGS. 2-5 schematically illustrate possible connections between an underlying hypothesis matrix and an applied sliding window.
Figure 3:
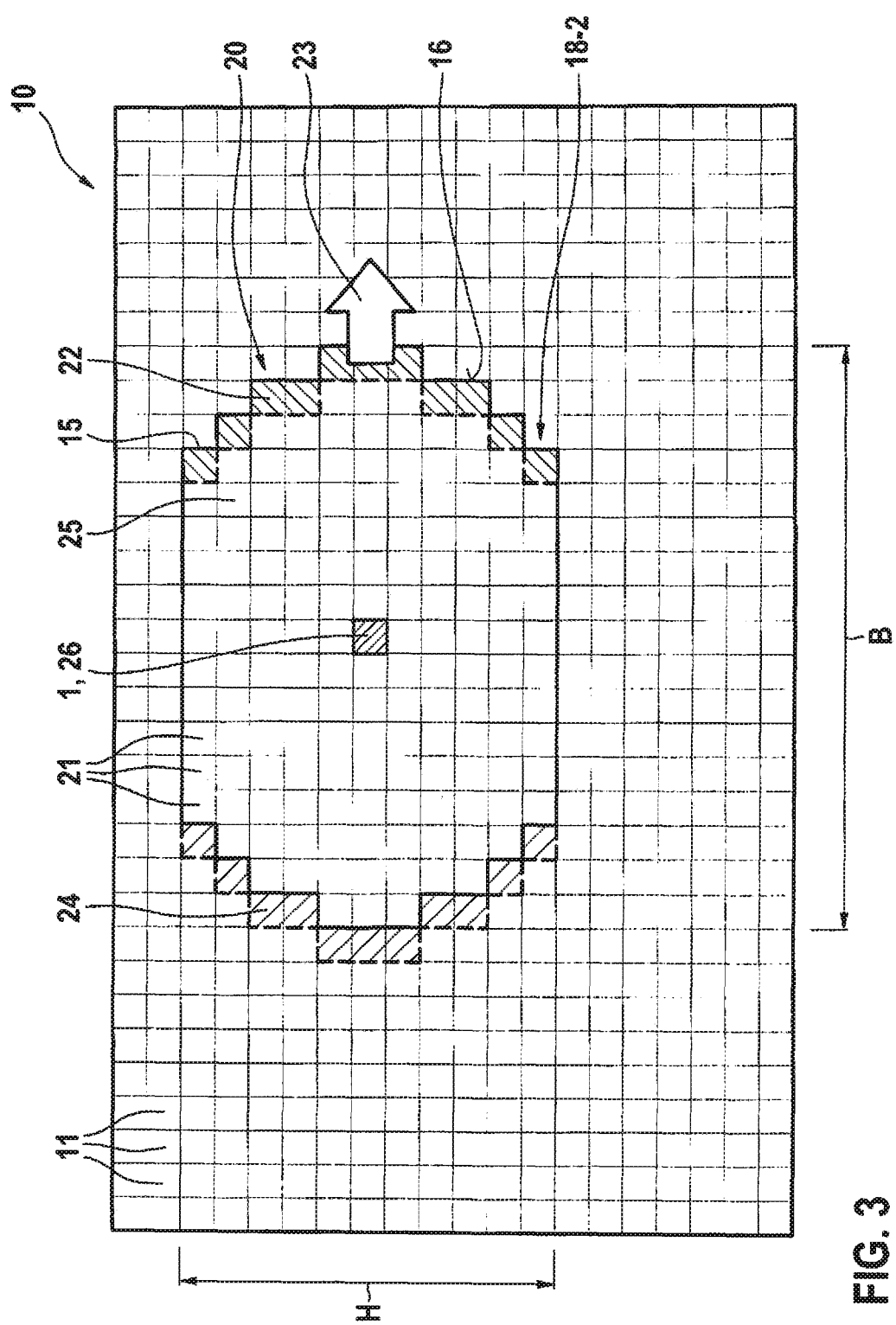

Whereas sliding window 20 has a rectangular shape 18-1 in FIG. 2, the shape 18-2 in the specific embodiment according to FIG. 3 is that of an oval.

Figure 4:
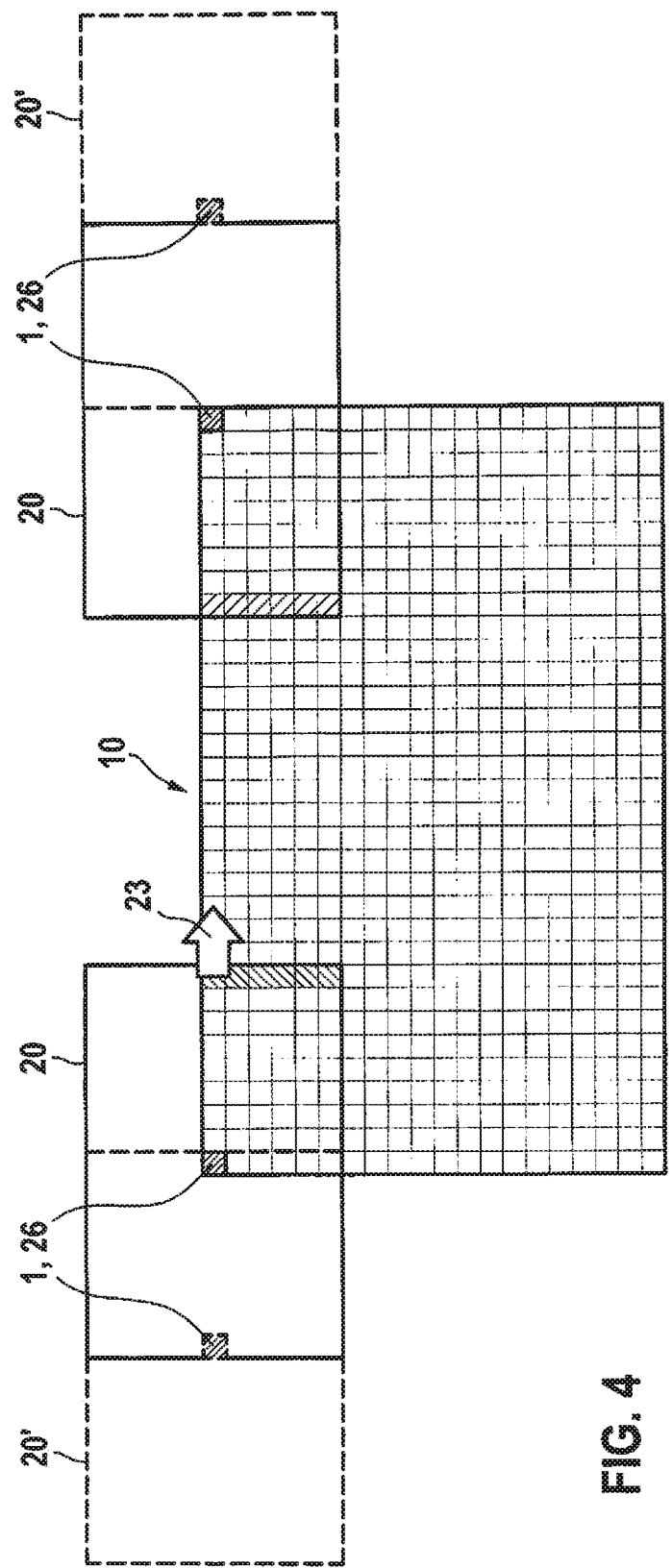
Figure 5:
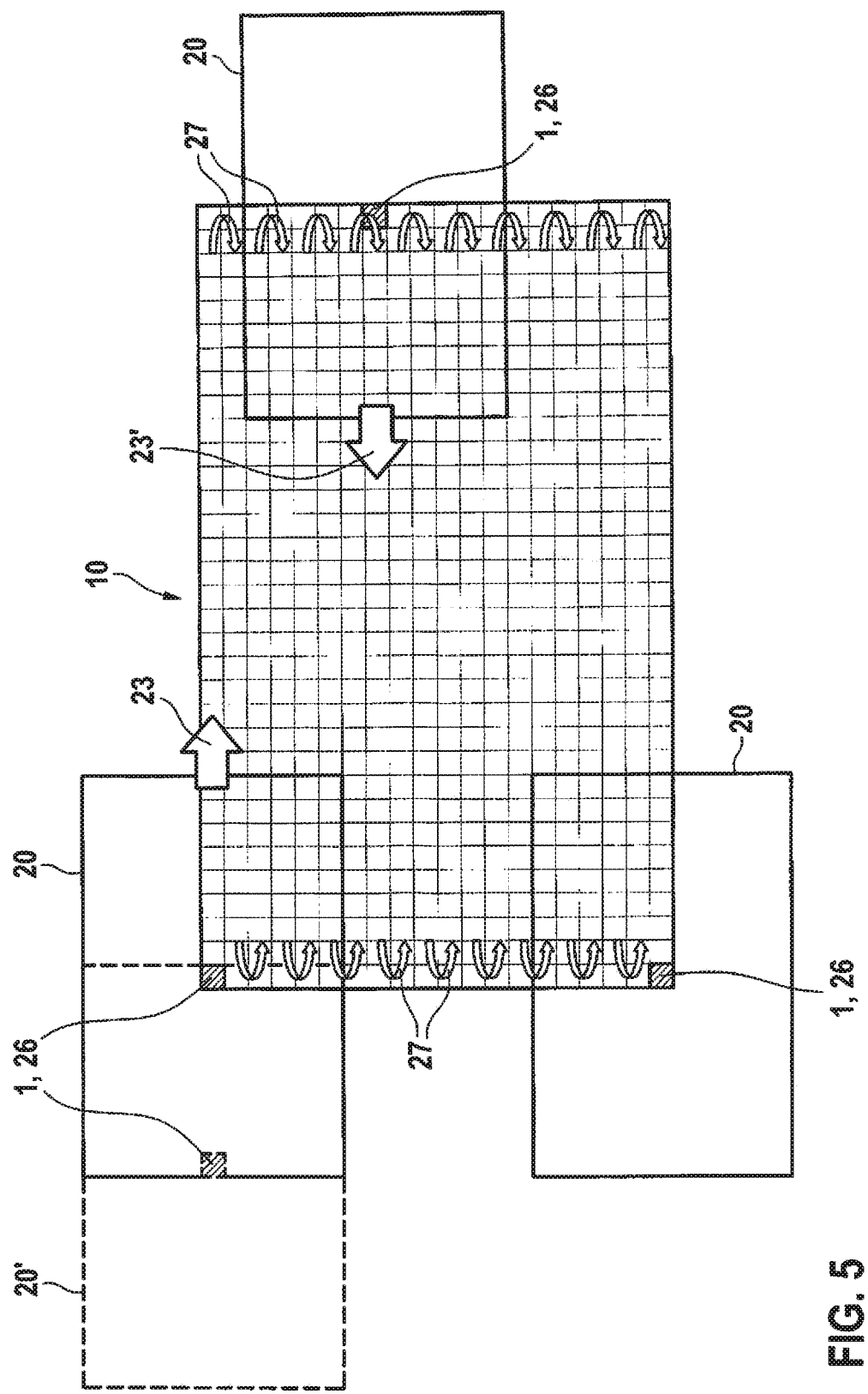

FIGS. 4 and 5 illustrate the handling of reference pixels 1, 26 and, in particular, of sliding windows 20 when reference pixel 1, 26 is located at the edge of hypothesis image 10, so that if reference pixel 1, 26 functions in this case as a central pixel of sliding window 20, sliding window 20 projects beyond the edge of hypothesis image 10.

FIG. 5 in this case also illustrates a back and forth movement of sliding window 20 in directions 23 and 23' with an interim row change in vertical direction 27.

These connections are further explained in the following paragraphs.

Figure 6:
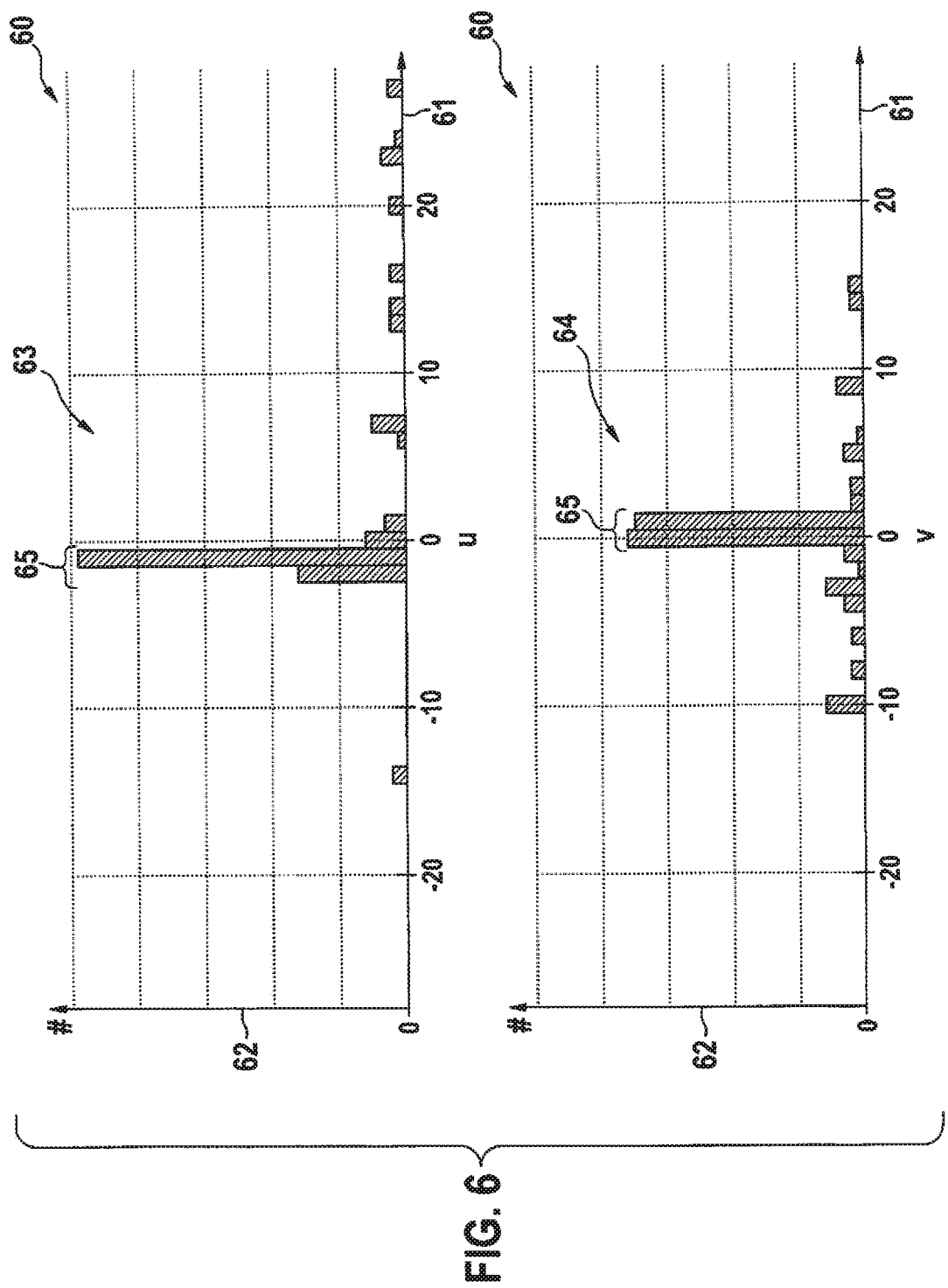
FIG. 6 shows graphs, each of which represents a histogram for one component of an underlying correspondence matrix.

FIG. 6 shows graphs 60, each of which represents a histogram 63, 64 for an element as a reference pixel or reference element 1, 26 of an underlying correspondence matrix 10, specifically for components u and v of correspondence hypothesis [u, v].

Figure 7:
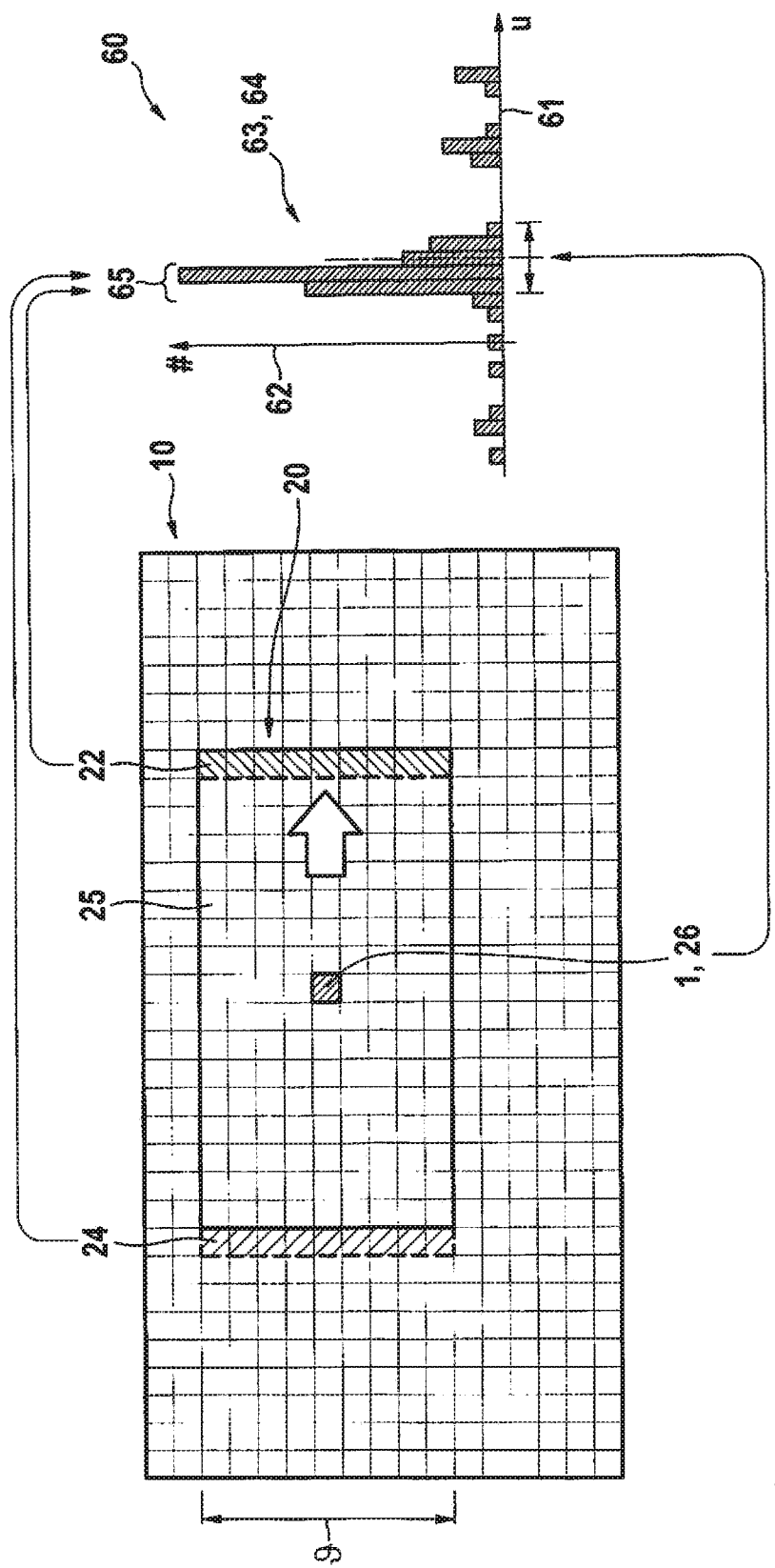
FIG. 7 also schematically illustrates a possible connection between an underlying hypothesis matrix and an applied sliding window.

FIG. 7 also schematically illustrates a possible connection between an underlying correspondence matrix 10 and an applied sliding window 20.

Figure 8:
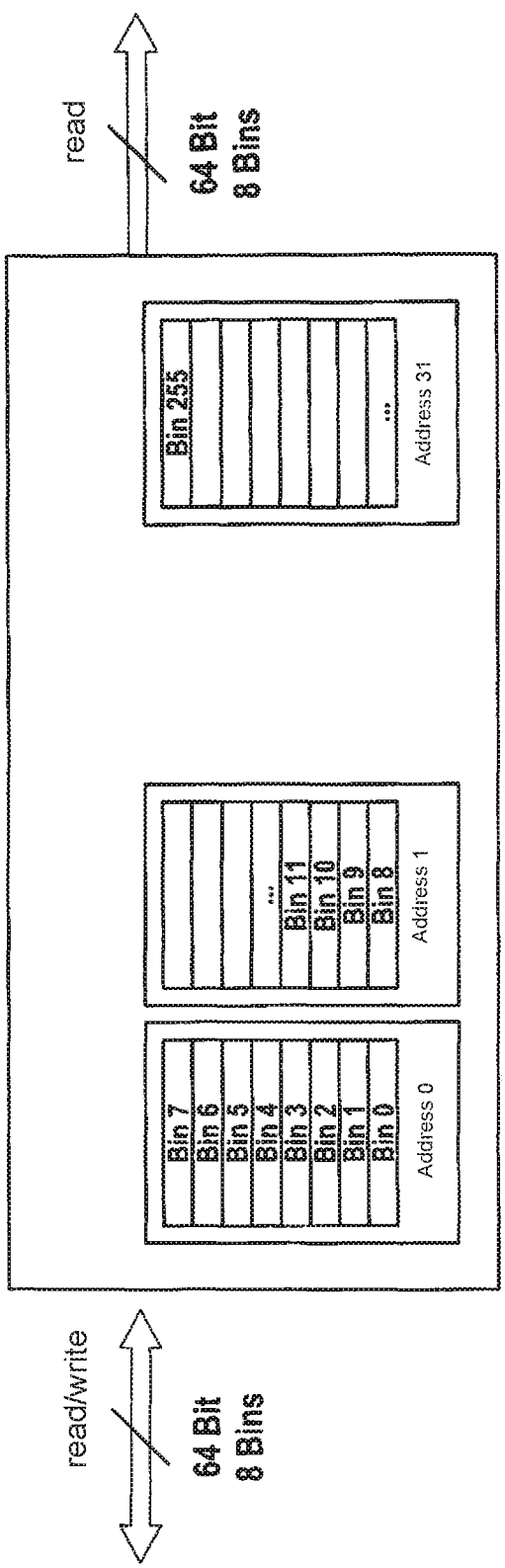
FIGS. 8-10 illustrate measures that may be taken to accelerate specific embodiments of the method according to the present invention.
Figure 9:
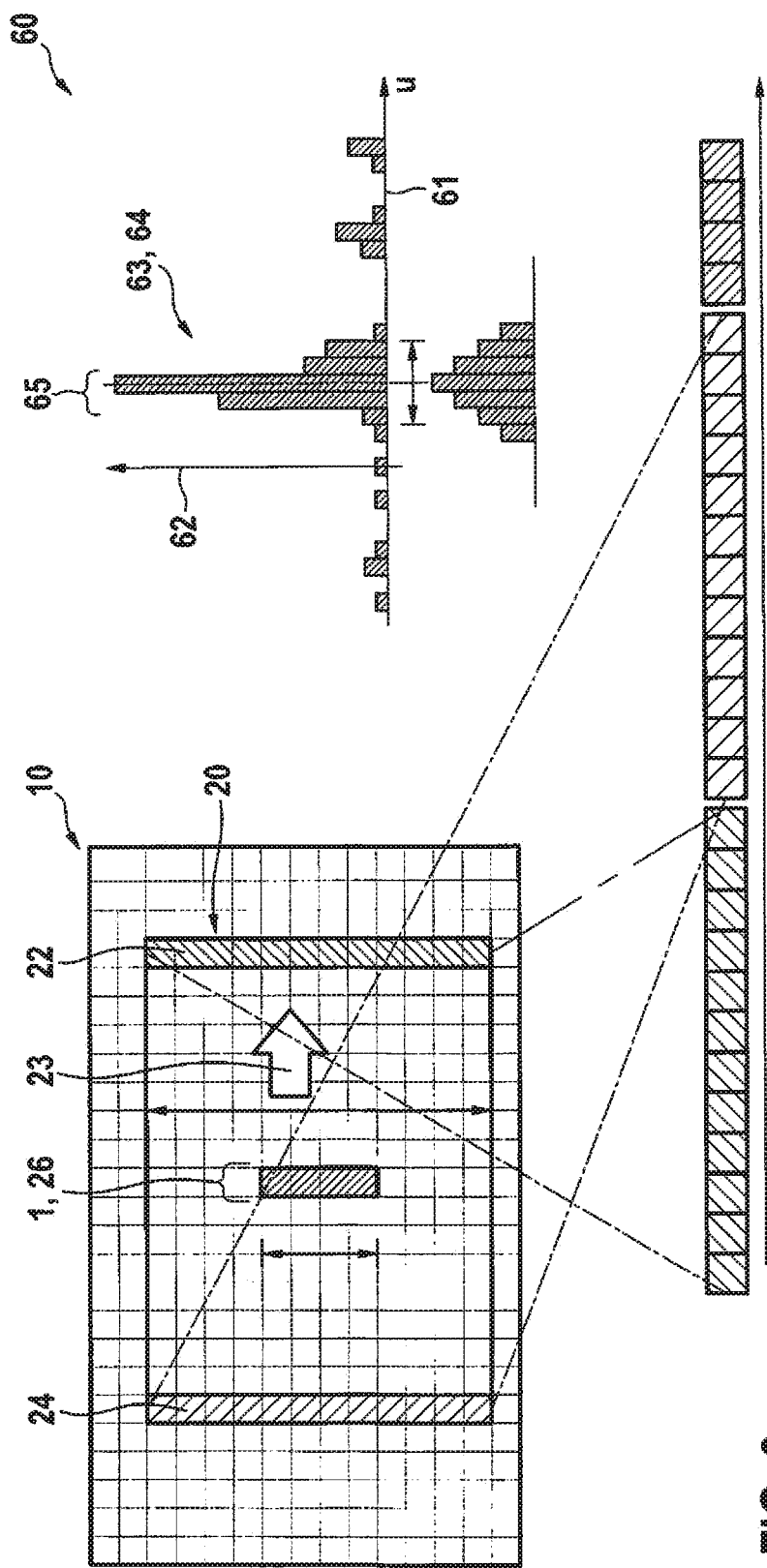
Figure 10:
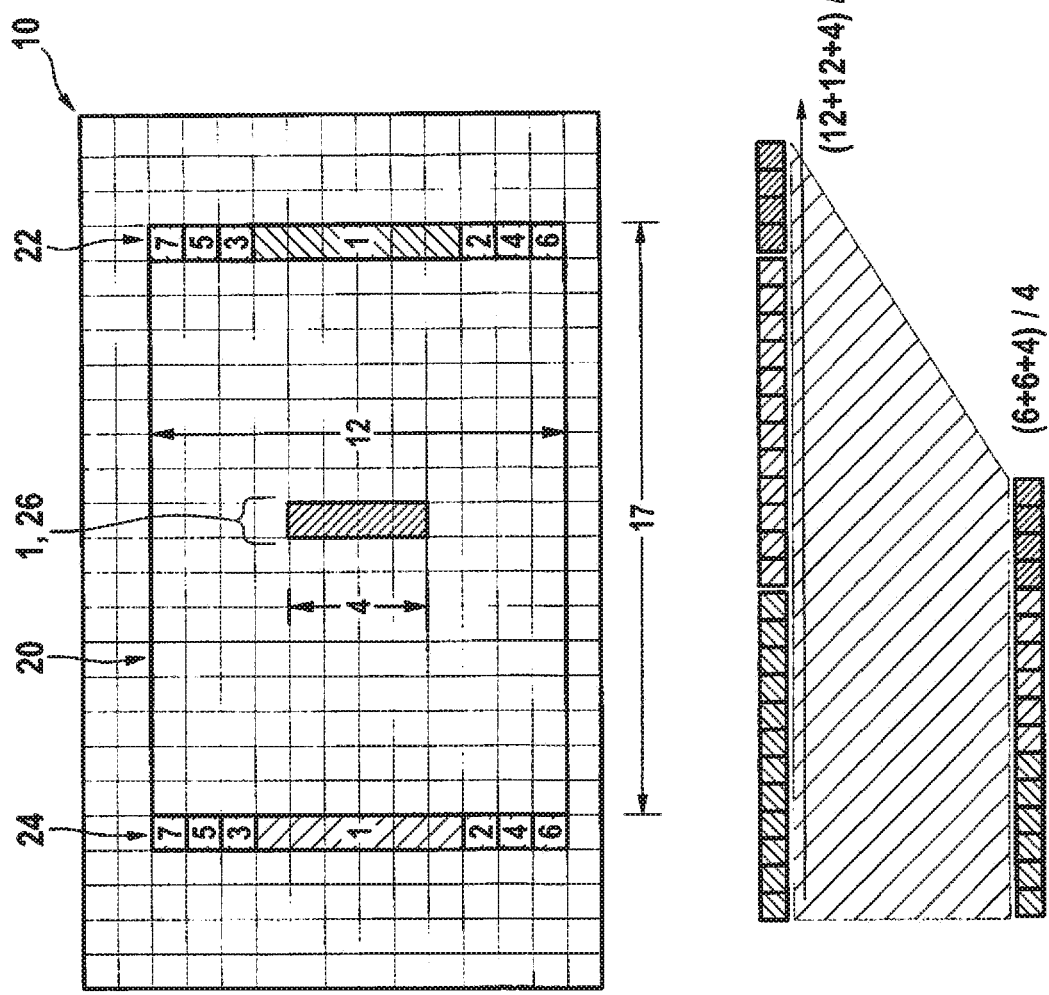

FIGS. 8 through 10 schematically illustrate measures that may be taken for accelerating specific embodiments of method S according to the present invention. These measures are explained in detail in the following paragraphs and relate, in particular, to the simultaneous evaluation of correspondence hypotheses [u, v] for a plurality of adjacent reference pixels 1, 26 of underlying hypothesis matrix 10.

These and other features and properties of the present invention are further explained with reference to the following statements.

The topic of correspondence formation is encountered in the area of computer vision, i.e., in machine-aided or computer-aided seeing, in particular, in the case of optical flow and stereo disparity.

In the cases of optical flow, also referred to above and hereinafter as OF, correspondences are formed in a temporal direction by determining assignments between coordinates in a first image and coordinates in a second image. Such a correspondence then indicates how the projection of a point in the 3D scene moves further temporally into a 2D image from an old coordinate to a new coordinate.

In the process, the movement in the image may be caused by the movement of the scene point, by the movement of the camera or by both simultaneously.

In the case of stereo vision, the two images are captured approximately simultaneously by two cameras situated at different locations. The relative arrangement of the cameras in this case is generally fixed and known. The correspondence formation allows the distance to the point in the 3D scene to be determined with the aid of triangulation.

A wide variety of methods for correspondence formation are known, these are presupposed here.

The results of the correspondence formation serve initially as hypotheses, thus, are potential correspondences, some or many of which may be erroneous and are then identified as outliers.

In this case, one or multiple hypotheses or also no hypothesis per image coordinate may be present.

One object of the present invention is to provide a preferably reliable method for verifying correspondence hypotheses, so that preferably many outliers are identified and, if necessary, eliminated and the correct hypotheses—as valid values or inliers—are largely maintained.

If multiple different hypotheses per image coordinate are present, then generally at most one of them is correct.

A core aspect of the present invention is the creation of a histogram-based method of verification of correspondence hypotheses. The underlying assumption in this case is that local vicinities of image points are usually maintained in the transition from a first image to a second image.

A vector—for example, a vector of the optical flow, which is also referred to as an optical flow vector,—which combines the coordinates of a scene point projected into both images with one another, therefore behaves usually similarly to the vectors at the adjacent image positions. "Similar" in this case means that it has a similar length and a similar orientation or has similar vector components, for example, with respect to the horizontal component u and the vertical component v.

In natural images which originate, for example, from a driver assistance camera, robotics camera or monitoring camera, this assumption is satisfied usually in most of the images. At the edges of objects, for example, at depth jumps in the scene, in particular, it may be violated, however.

Flow fields ascertained with respect to correspondingly successive images may be visualized in a different way, for example, with the aid of a color coding, a respective color indicating the flow direction, for example, yellow: downward, blue: upward, pink: to the left, green: to the right. The color saturation indicates the length of the flow vector, so that the zero vector, for example, is depicted as white. Black areas may then be utilized for those cases for which no value for the optical flow is able to be determined.

In natural images—i.e., for example, in the optical imaging of natural scenes—it is the case that adjacent pixels of temporally successive images or, in the case of stereo vision, images assigned to one another, have mostly similar flow vectors or correspondence vectors, and that thus the assumption of the similarity in the local vicinity is properly satisfied. This assumption is advantageously utilized by the present invention.

As was previously mentioned above, exceptions apply, in particular, at object edges, for example, at the edge between an imaged pedestrian in the foreground of the image and the equally imaged background of the image or at the edge of an imaged cyclist in the foreground of the image and the background and the like. Here, however, the assumption is frequently always at least partially satisfied, because at least a part of the adjacent pixels exhibits similar correspondences, for example, flow vectors. Such cases are also covered by the present invention.

In conjunction with the present invention, the optical flow usually is mentioned by way of example as an example of the correspondence formation. However, other applications, for example, stereo systems, multi-camera systems and more are also covered. It is not necessary in this case for the underlying camera systems to be calibrated. Thus, for example, the epipolar rectification—based on a calibration—frequently used in stereo systems is also not necessary in order to be able to apply the present invention. The present invention may even be applied to much more general examples of correspondence formation, such as locating similar text sections in a document or across document boundaries.

By entering the correspondence hypotheses of the local surroundings and, in particular, their values for the movement in the horizontal direction or u-direction, and in the vertical direction or v-direction, in each case in a single and then one-dimensional histogram or in a combined, shared and then two-dimensional histogram, peaks or maxima are formed with suitable scaling in the histogram, which originate from the dominant local movement. This is depicted in FIG. 6, for example, for the use of two separate, one-dimensional histograms.

There exist therefore multiple possibilities for selecting suitable histograms:

Two one-dimensional histograms:
  A one-dimensional histogram is used for the first movement component, for example, the horizontal movement u. The second one-dimensional histogram is used for the movement component perpendicular thereto, for example, the vertical movement component v.
  Movement components u, v need not be oriented on or in parallel to the image axis of the respectively underlying images. Diagonal components, for example, or any other orientation, are also possible.
  The components may also represent other variables, for example, the direction and the length of a flow vector.

A multi-dimensional histogram (composite histogram):
  In a multi-dimensional histogram, which is also referred to as a composite histogram, for example, in a two-dimensional histogram, the two components u, v are not considered separately from one another, but rather jointly.

In addition, the value ranges and the resolutions must also be established. The value range of the respective histogram is meaningfully oriented to a global or to a local search area of the correspondence formation, for example, at the minimal and the maximal locatable horizontal movement in the optical flow.

The resolution in each case or the interval widths of the histogram intervals, which are also referred to as histogram bins, may, for example, be oriented to the desired accuracy or to the resolution of the given hypotheses or to the amount of available memory.

The interval widths should not be selected to be too small, however; otherwise, there is the risk that in each case too little data fall into a histogram bin or histogram interval and, as a result, the determination of majorities is hampered or becomes more complicated due to lack of clarity.

In order to avoid or to reduce undesirable quantization effects, which may arise as a result of the given interval widths, it may be advantageous not only to enter the value to be entered in the histogram—for example, an increment +1 or decrement −1 or an additive signed weight, into a bin, but to distribute it weighted to the two nearest bins.

Example: instead of the value u=9.4, to round off to 9 and to add +1 at the appropriate point in the histogram, a weight +0.6 would be added for 9 and a weight +0.4 would be added for 10 and thus, the total weight of 1.0 would be distributed to two bins, specifically, with a weighting corresponding to the intervals.

The respective histogram may be implemented as a sliding histogram or with the aid of a sliding window, as this is also depicted in connection with FIG. 2. This saves computing time and data transfers from/to the memory, because the content of the histogram as a whole need not always be newly structured, but may be continuously updated.

The sliding histogram may be implemented by a sliding window, which has, for example, a rectangular shape or another shape, for example, the shape of a circle, of an oval, of an ellipsis, of a polygon, etc.

In addition to the histogram, it is advantageous to also provide a memory, in which the sum of all entries are continuously entered into the histogram, i.e., the number of hypotheses situated under the window or the sum of the weights situated under the window. This sum must therefore be updated with each write access into the histogram.

Providing the sum memory offers the advantage that the number or the total weight may be retrieved at any time and need not be first recalculated. It may, for example, be useful for the purpose of standardization to determine, for example, how large the relative proportion of hypotheses (under the updated window) is, that support a particular movement hypothesis.

In two one-dimensional histograms for the vector components, it is sufficient to provide the sum memory only once, since the sum of the respectively entered weights for both histograms in the preferred embodiment is identical.

Sliding Window (Exemplary Embodiment)

A, for example, rectangular window 20 according to FIG. 2 having width B and height H or a differently shaped window 20, for example, according to FIG. 3, is effectively pushed across image 10 and or the memory of hypotheses or of its components. A snapshot is shown in each of FIGS. 2 and 3. Window 20 as a sliding window is pushed, for example, in pixel columns from left to right across image 10 of correspondence hypotheses or across an image 10, each of which contains a component of the correspondence hypotheses, for example, the u-component. The movement of window 20 is characterized, for example, by arrow 23.

Window 20 is located directly at the position marked by the black frame. Pixels 22 at the right margin of window 20 have therefore just migrated under window 20 and pixels 24 have departed window 20 at the left margin. An update for precisely these pixels 22 and 24 is carried out. In the process, the hypotheses of the positions of pixels 22 are entered into the histogram by incrementing corresponding counters or by adding corresponding weights for the individual histogram intervals or bins. The "opposite" update is carried out for pixels 24, specifically, in the sense that here the corresponding counters are decremented again or the corresponding weights are subtracted with respect to the individual histogram intervals or bins. In this case, it is ensured—when a respective update is completed—that precisely those hypotheses are taken into consideration in the histogram that are directly situated under window 20, i.e., inside the frame of window 20. Hypotheses outside window 20 on the other hand have no influence on the content of the histogram.

In this case, one or multiple hypothesis(es) or also no hypotheses may be present for each image position (depicted here as pixels). For example, 0 to 3 hypotheses per pixel may be stored. This means that when updating, these up to three hypotheses are entered into or removed from the histogram.

Pixel 1, 26 represents a reference position, which is situated, for example, in the center of window 20. Pixel 1, 26 is the pixel to which the instantaneously created histogram relates. Statements, for example, for the purpose of verification, may be made for the hypotheses at or near the reference position based on the updated histogram content, as is also explained below.

Arrow 23 indicates in which direction window 20 is further pushed when the histogram update step and the verification step are completed. The orientation of window 20 and direction 23 of the pushing or sliding of window 20 are preferably selected in such a way that window 20 has the smallest possible "front end" or leading edge during the sliding or pushing of window 20, because then the number of pixels incorporated in the update is minimal. In this example, 2-H pixels or image positions are incorporated in the update. This number is smaller than 2-B.

A respective window 20 need not be situated completely in image 10, but may also overlap at the margins. FIG. 4 shows how window 20 slides to the left into image 10 and slides out to the right. Reference position 1, 26 is situated here in the first image row.

This approach according to FIG. 4 may be advantageous, i.e., in that window 20 is pushed step-wise into image 10, i.e., into the hypothesis matrix. In this case, it is never necessary to initially fill histogram 63, 64. Instead, an empty histogram 63, 64—all bins are set to 0—may be assumed and only the updating process establishes any required filling state of respective histogram 63, 64, even at the image margins.

FIG. 4 shows by way of example how window 20 is pushed from left to right in the direction of arrow 23 and the overlap initially increases in the process. The values for pixels 22 at the right margin of window 20 are entered, whereas no pixels are yet present at the left margin of window 20, i.e., nothing is yet removed. It is the reverse at the right margin of image 10. There, the values for pixels 24 at the left margin of window 20 are removed as long as there are no longer pixels present at the right margin, i.e., nothing more is entered until histogram 63, 64 is completely emptied, i.e., the initial state is reestablished.

Instead of allowing window 20 to pass completely out of image 10, it is alternatively also possible to carry out a reset, in which all memory locations are set to 0 once the histogram content is no longer required for a verification step.

Once a row is fully processed, the same process may be carried out in the next row, for example. The process is also parallelizable.

FIG. 5 shows a specific variant for the processing of image 10 with a change of direction of sliding window 20, in each case to the right and to the left at the margin of image 10.

The direction of the sliding or shifting may thus also be changed, for example, in each case if reference pixel 1, 26 has reached a margin of image 10. For example, window 20, starting from left to right, would be shifted to the right until reference pixel 1, 26 touches the margin, but is still situated in image 10. Then, window 20 would be shifted, for example, downward by one pixel, i.e., the update process would be carried out by way of exception for the wide side. Window 20 would subsequently be allowed to pass in the direction opposite the previous direction, i.e., from right to left, until reference pixel 1, 26 reaches the left margin of image 10, to shift again downward by one pixel and change direction again, etc.

In the interim, the histogram would generally not reach the initial state. This presents no problem, however, but even an advantage, since fewer data need be entered or removed.

Histogram Data (Exemplary Embodiment)

FIG. 6 shows a typical snapshot of histograms 63 and 64 for the components u and v, which are implemented here with a resolution (interval width) of 1 pixel. It is apparent that peaks 65 are formed, which represent the dominant movement within window 20. Peak 65 is distributed usually over one or a few bins, depending on the resolution of the histogram.

FIG. 1 depicts specifically a snapshot of the content of the two one-dimensional histograms 63 and 64 for the horizontal (histogram 63) and vertical movement component (histogram 64) u and v.

Two or multiple dominant movements also exist in part within window 20 when, for example, in the application with window 20, half corresponds to a pedestrian in the foreground of an image and the other half corresponds to the background of the image, overlap there, and the halves exhibit different movements in the image. Then, correspondingly multiple peaks 65, which represent these multiple movements, are generally found in the histogram.

Outside the dominant peak or peaks 65, the histogram bins are filled with zero or with small values. These small values are usually caused by outliers.

The representation with histograms 63, 64 is thus well suited for separating the dominant and, therefore, likely correct movement from the outliers, which appear rather statistically dispersed.

Weighted Histograms

Events are counted in a classic histogram 63, 64. As previously mentioned, it may be advantageous, however, to consider hypotheses [u, v] as not each having identical weight 1, but having different individual weights. Thus, it is possible, for example, to take into consideration a measure for the confidence in the respective hypothesis.

An algorithm for each hypothesis not further considered here could, for example, also specify an individual measure of quality, measure of confidence, weight or the like.

Such a measure may be taken into consideration with the entry into histogram 63, 64 by replacing the histogram counter with a total weight. For this purpose, a corresponding value range must be provided. In this case, it is advantageous to continue to operate with integer values or fixed decimals in the sliding histogram, not with floating point numbers. It should preferably be ensured that deviations do not occur as a result of non-cancelling rounding-off errors during the ongoing addition and subtraction. This risk would exist in the case of floating point numbers. A potentially necessary rounding-off should be performed in advance, so that in the case of the sliding histogram 63, 64, it is ensured that the entered weight is later removed again without a remainder being left occurring as a result of rounding-off.

In the case of weighted histogram 63, 64, the sum counter, which indicates the instantaneously entered hypotheses, becomes a weight sum counter, which indicates the sum of the weights of the instantaneously entered hypotheses.

Verification Step

Once the update has been carried out, as described above, the content of the histograms 63, 64, represents the movement hypotheses located under given window 20, the verification step may be carried out for the hypotheses at the reference position, and, if necessary, in the small surroundings around the window.

In the verification step, it is checked whether sufficient support from the vicinity is present for each hypothesis considered, the vicinity being established by the size and position of window 20 in relation to reference position 1, 26.

These hypotheses from this vicinity, to give a vivid example, have thus cast their votes, as in an election, and in each case have voted for a particular movement, specifically, in components in two one-dimensional histograms 63, 64 or in vectors in a two-dimensional composite histogram.

For the hypothesis to be verified, it is then checked whether it is supported by a majority or whether there is at least a sufficient amount of support.

In two-dimensional histograms 63, 64, this check is carried out individually per component and the result is combined, for example, by drawing upon the poorer of the two results or by linking the two results in another way to one another, for example by addition.

The step of checking in this case may appear as described below, the check being related to a hypothesis vector, which is assigned, for example to marked position 1, 26 in FIG. 2 or FIG. 3, and thus includes, in particular, the following steps:

breakdown of the hypothesis vector into its components (omitted in the composite histogram)

reading access in the respective histogram 63, 64 at the position 1, 16, which corresponds to the movement (component) of the hypothesis. If, for example, the u-component of the hypothesis is −1.7 pixels, the histogram would be read out having interval widths of 1 pixel at the point which stands for u=−2, optionally also at the point for u=−1, because the value −1.7 is between u=−2 and u=−1.

Histogram 63, 64 may optionally also be read out at other positions located in the vicinity, for example at the positions −3 and 0. In a composite histogram, a small, for example quadratic, section in the vicinity would be read out.

The read out values, which correspond to counters or weights, are then combined, for example, added or added in a weighted manner, in order to ascertain an evaluation value. The weights may be selected as a function of (rounded or unrounded) values of the hypothesis. In the case of the aforementioned value −1.7, for example, the weights 0.7 and 0.3 could be applied for the histogram entries read out where u=−2 and u=−1. The histogram entry where u=−2 would therefore be more heavily weighted, because −1.7 is closer to −2 than to −1. All weightings may preferably also be performed using integer values—for example, fixed point presentation.

This evaluation value represents a first evaluation for the hypothesis. The higher this evaluation is, the clearer is the confirmation from the vicinity for the present movement. The value would be low in the case of an outlier.

In two one-dimensional histograms, two evaluation values would occur, which may be combined, for example, by considering the minimum or the sum.

This optionally combined evaluation value may be compared with a threshold, in order to decide whether, based on sufficient support from the histogram-based evaluation, the hypothesis is trustworthy or not.

Alternatively or in addition, the evaluation value—if necessary in quantized or coded form—may be appended to the hypothesis as additional information and passed on, for example, in order to be evaluated at a later point or to be provided at an interface.

Instead of using an absolute threshold, it is alternatively or additionally possible to also consider a relative threshold. For example, the sum counter or the weight sum counter may be used in order to determine how large the proportion of hypotheses from the vicinity is which support the hypothesis just considered.

In the histogram-based vote, it may be meaningful or desirable, to discount the individual vote in each case, so that a hypothesis is not able to vote for itself. This is easily possible by subtracting in each case the individual weight when reading out the corresponding respective histogram bin and the sum counter or the weight sum counter.

Alternatively or in addition, the peak position may also be used for verifying a hypothesis vector:

A dominant movement may be ascertained at any point in time from histogram 63, 64 or from histograms 63, 64, for example, by establishing which movement corresponds to the dominant peak. Which bin the dominant peak is to be assigned may, for example be established as follows:

by the bin with the highest weight, by the bin which, together with one adjacent bin, has the lower or equal weight in each case, in sum bears the highest weight of all such bin pairs, by the bin, for which the highest weight is ascertained given a weighted average over a predefined proximity of bins (implementable, for example, by folding the histogram, for example, using symmetrical coefficients [$c_2$, $c_1$, $c_0$, $c_1$, $c_2$] with $c_0 \geq c_1 \geq c_2 \geq 0$.

The two last mentioned points represent smoothing measures, which in practice result in a more stable peak selection and are therefore to be preferred.

The dominant peak position may be ascertained in various ways:

Full search across respective histogram 63, 64: this method always finds the dominant peak, but requires greater effort, since the entire histogram is read out.

Incremental search: after each change of the histogram content or after a number of changes or after a certain period of time, it is checked whether the dominant peak has "further migrated," for example, by one bin position to the left or to the right or by a few bin positions. Only a small effort is required for this check.

Check of the dominant peak position after the histogram update: For each bin that is changed, it is checked whether in the interim the dominant peak position is situated there (or optionally in close proximity).

Comparison of the weights assigned the potentially dominant peak with the sum weight. As long as the ratio is greater than ½, the dominance is confirmed. This test is usually successful in examples as shown in FIG. 5.

With a combination of the last mentioned methods, the full search is only seldom necessary or no longer necessary at all.

In addition to the "first" dominant peak position, it is also possible to ascertain a second or second-best peak position, if necessary, a third peak position, etc. This is advantageous and of practical relevance, in particular, if multiple dominant movements are situated within window 20.

When checking a hypothesis, it is taken into consideration whether or how close it is situated to the dominant peak position or to one of the dominant peak positions.

For example, it could be required that both components of the hypothesis are no further than 3 bins away from a peak in respective histogram 63, 64 in order to accept the hypothesis.

Alternatively or in addition, a measure of quality could be appended to the hypothesis, which includes a statement about how well the hypothesis is supported by the dominant movement (or by one of the dominant movements).

The results of the majority-based verification of correspondences have a typical "appearance", for example, when results are visualized in color, as has been mentioned at the outset.

This is particularly true in the boundary areas when the method is applied to difficult data, for example, in the case of weak signal-to-noise ratio or movement unsharpness or in the case of concealment. The method is easy to recognize based on the type of degradation and on several characteristic properties, for example, by the formation of clusters of results due to the mutual confirmation of hypotheses, by sharp jumps at object edges (no smearing) due to a change from one dominant peak 65 to another dominant peak 65 and/or by the positive efficiency when comparing input and output in the sense that almost no outlier hypotheses remain.

In addition, the access patterns to the memory and buffer memory are very characteristic when window 20 slides across image 10 of hypotheses, as is shown in connection with FIG. 2.

The present invention is suitable, for example, for implementing on CPUs, FPGAs and as an ASIC or an ASIC IP and may be implemented on all platforms.

The method of optical flow, also called optical flow method (OF) is a method for analyzing movement with or in conjunction with computer vision methods.

A camera sensor is able to generate images that contain projected 2D points of the 3D world. In OF, images are analyzed which have been recorded at different exposure times, and so-called correspondences are constructed for those points whose coordinates may be localized in both images. A correspondence vector connects the coordinates of one pixel in the first image with the coordinates of the same 2D point in the second image. The correspondence vector in optical flow is also called a flow vector.

The method described above describes the approach for identifying and confirming or rejecting outliers of a hypothesis image 10.

The procedure described below explains as an additional aspect the possibility of acceleration in the above described basic method, in order to achieve a real-time processing during the verification process or in order to reduce the computing time for the verification process. In this procedure, the above described verification process is modified, which may lead to different results. The difference in the results in this case is so minimal that when practically applied it results in no relevant disadvantages.

The methods described here may be used, for example, in the implementation of computer vision ASICs.

In a processing throughput of, for example, 60 full HD images per second, a driver assistance camera system must achieve a minimal power consumption of at most a few watts, in order to enable an automatic intervention system, for example, an emergency braking assistance function. In such camera systems, the memory bandwidth is not sufficient to carry out a histogram-based verification regarding every correspondence hypothesis. The size of the image area in which histogram 63, 64 must be calculated determines the computing time and the time for the processing of the algorithm. For large areas or regions, the required time for updating the histogram and for analyzing the content could impair a system in processing images B1, B2 in real time in an embedded system. In the event the region is small, the peak of histograms 63, 64 is potentially not pronounced strongly enough in order to reliably enable the distinction between outliers and correct hypotheses.

The present invention accelerates the method for rejecting or verifying outliers and makes it possible to achieve real-time applications such as an emergency braking assistance function in an embedded system.

The following described aspects reduce the processing time of a histogram-based procedure for verifying the correspondence vector hypotheses using the content of histogram 63, 64 instantaneously present in a memory, multiple hypotheses being checked in parallel.

In the following description, it is assumed that the first step for determining the correspondences has already been carried out, so that an image 10 including correspondence hypotheses that must be checked is available in a memory unit. It is assumed that this image 10 contains valid elements and outliers. Valid elements, also referred to as inliers, typically represent the true movement, whereas outliers are false correspondences. Only the outliers must be rejected and the others, i.e., the former, must be preserved. This is typically the last processing step so that its output is correspondence vector image 100, correspondence vectors being able to be optical flow vectors, for example. One property of the outliers is that they are randomly distributed, whereas the inliers are spatially supported by adjacent pixels. For this reason, a verification based on histograms 63, 64 is a good choice, since the inliers belong to local or global peaks 65 of a histogram 63, 64.

It is assumed that a memory is used in order to store the values of the histogram bins for a given area. There are multiple possibilities for storing the values of a sliding window histogram in an electronic device. One possibility is to use the build memory within an IP having bit memory cells, for example, flip-flops. These have the potential to access all bins of the histogram in only one clock cycle, but their costs are too high to be taken into consideration in a product.

A further approach is to use the in-chip or off-chip memory having user-defined input and output ports. These memories have a limited number of ports for reading the values and for storing. When designing an electronic system including the corresponding required memory, a compromise must be found between the size of the required semiconductor area (greater area has a strong influence on costs) and performance. The memories may be selected from a single-port memory (only one read operation or write operation per clock cycle) or from dual- to quad-port memories (including two, three or four read operations and only one write operation in the same clock cycle). Since the quad-port memories are not available in all electronic devices and their surface consumption is greater, the dual-port memories are the most frequent for applications, in which a higher through-put is required.

In the above described verification method, an approach including a sliding window 20 is used for rejecting outliers of the OF. It reduces the data transmissions from the memory that contains the correspondence hypothesis image 10 into the memory that contains histogram 63, 64, since histogram 63, 64 need not always be recreated. Read operations and write operations in the histogram memory are reduced to double the number of rows in the area in which histogram 63, 64 is calculated. A rectangular sliding window having a height of 9 rows is shown as an example in FIG. 7. To simplify, it is assumed for the following observation that exactly one hypothesis is present per pixel—in reality multiple hypotheses or no hypothesis at all per pixel may also be present—and that each hypothesis contributes with weight 1. The updating of a histogram then lasts 18 clock cycles due to the height of 9 rows, since 18 addresses must be accessed. The 9 bins of the new column that enter into histogram 63, 64, must be incremented, and the 9 bins of the old columns that depart the histogram 63, 64 must be decremented.

Once histogram 63, 64 is updated, the next step is to identify whether the instantaneous correspondence hypothesis belongs to a peak 65 in the histogram. This takes place by accessing some of the adjacent bins or histogram intervals, followed by the comparison between the values of these bins. Since the updating and the evaluation of histogram 63, 64 must take place for the entire correspondence hypothesis input image 10, the real-time processing of the above described procedure for large images is not possible due to the limited memory bandwidth in an embedded device.

The present invention also provides three methods for accelerating the verification of correspondence hypotheses.

The first acceleration method is to save clock cycles during the evaluation of histogram 63, 64. In the process, the memory storing histogram 63, 64 is organized in such a way that one clock cycle is sufficient for obtaining the up-to-date average pixel and up to four of its adjacent bins or histogram intervals. This is shown in FIG. 8. The read address must be calculated by adding or subtracting a value that is stored in the middle or central pixel. For example, by grouping eight histograms into one address, it is possible to read up to eight adjacent bins in only one cycle. Given the fact that the middle pixel of histogram 63, 64 is assigned to bin number 11, for example, the read addresses must be set as address number 0 for the first port and the address number 1 at the second port. Both ports together contain a total of 16 bins, from bin number 0 to bin number 15. The first read port supplies the fourth bin (bin number 7) on the left side of the up-to-date center (bin number 11). The second port contains the other three bins to the left (bins 8 through 10) and the other four bins on the right side (bin 12 through 15).

The second acceleration method reduces the total time of the processing of the entire correspondence hypothesis image by using the content of histogram 63, 64 for verifying N correspondence hypotheses in parallel, instead of verifying only one correspondence hypothesis as in the original proposal. A slight asymmetry occurs then because not all hypotheses may be situated in the middle of window 20 (which was 9 rows high in FIG. 7, for example), for which histogram 63, 64 is calculated. In order to partially compensate for this asymmetry, it is possible to increase the number of rows, preferably by N−1 rows. Although increasing the number of rows increases the time for updating and evaluating histogram 63, 64, the total time for verifying a complete correspondence hypothesis image 10 is reduced, since with a histogram filling state, it is possible to verify N hypothesis at the same time.

In this example, an increase in the effort by the factor $(8+(N-1))/9=(8+n)/9$ due to the increase in number of rows is offset by a reduction by a factor N corresponding to the number of histogram updates. On the whole, therefore, a factor (8+N) is to be considered in this example by which the processing time of the algorithm is reduced.

On the other hand, the asymmetry also results in slightly changed results as compared to the above described non-accelerated approach according to the present invention.

So that the results are not changed too significantly due to the asymmetry, a value of N=4 has proven to be a good compromise with respect to the quality of the results and processing time. Where N=4 as shown in FIG. 9, sliding window 20 includes twelve rows and the histogram update and histogram evaluation may be carried out in 24+4 clock cycles, which results in a throughput of 28 clock cycles for the verification of 4 input correspondence hypotheses. The resultant throughput of 7 clock cycles per input correspondence hypothesis enables a real-time processing of the above described method or algorithm also for full HD images and at low clock frequencies, which are required for a low power consumption in an embedded device.

The third acceleration method is based on a reduction of the time required for updating histogram 63, 64, which may be advantageously applied, in particular, when hypothesis image 10 is sparsely populated. Then, many of the incoming and outgoing hypothesis memories contain no information for updating histogram 63, 64. This property may be utilized in order to reduce the number of rows for updating histogram 63, 64 to a fixed number, which is smaller than the total number of rows of sliding window 20. For example, the number of correspondence hypotheses to be considered could be limited from twelve to six, taking into consideration sliding window 20, in which twelve rows are used to update histogram 63, 64, in order to accordingly reduce the number of clock cycles required also by half. In the unlikely case that more than six hypotheses are available for contributing to the update, the remainder must be skipped. In this case, it is necessary to define a priority sequence.

One sequence for searching for the presence and for reading hypotheses for the histogram update is depicted in FIG. 10. The six pixels numbered with 1 have the highest priority and are always read. If some of these pixels include no correspondence hypothesis, the next pixels are then to be read, which are numbered with 2, 3, etc., specifically, until maximal six correspondence hypotheses are read. It has been empirically proven that the updating of histogram 63, 64 in this way achieves a similar quality of result as the updating of the histogram without skipping the remaining hypotheses.

The time required for verifying a correspondence hypothesis may be reduced from thirty clock cycles to nearly four clock cycles taking into consideration the three acceleration methods and a sliding window 20 having a height of 12 rows, as a result of which a real-time implementation of the method or the algorithm in an embedded device is achieved, for example, at 60 full HD images per second.

What is claimed is:

1. A method for evaluating images and for evaluating correspondence hypotheses of images, the method comprising the following steps:
   providing correspondence hypotheses between first and second images each given as a corresponding image matrix, in a corresponding hypothesis matrix;
   evaluating the hypothesis matrix and conditionally verifying the correspondence hypotheses; and
   providing verified image correspondence hypotheses as image correspondences in a correspondence matrix as a result of the evaluation, the evaluation of the hypothesis matrix being performed in that for each element as a reference element of the hypothesis matrix in surroundings of the reference element for at least one component of the correspondence hypotheses, a histogram with respect to values of the component is formed and evaluated, wherein the formation of the histogram for the respective element of the hypothesis matrix takes place by classifying and totaling or totaling in a weighted manner the respective components of the correspondence hypotheses in a given histogram classification for all elements of the hypothesis matrix within an interior of the surroundings of the respective element, and wherein when forming the respective histogram, the surroundings for the respective element of the hypothesis matrix are provided in each case with a window overlaying wholly or partially the hypothesis matrix in the manner of a rectangle, of a polygon, of an oval, of an ellipsis or of a circle.

2. A method for evaluating images and for evaluating correspondence hypotheses of images, the method comprising the following steps:
   providing correspondence hypotheses between first and second images each given as a corresponding image matrix, in a corresponding hypothesis matrix;
   evaluating the hypothesis matrix and conditionally verifying the correspondence hypotheses; and
   providing verified image correspondence hypotheses as image correspondences in a correspondence matrix as a result of the evaluation, the evaluation of the hypothesis matrix being performed in that for each element as a reference element of the hypothesis matrix in surroundings of the reference element for at least one component of the correspondence hypotheses, a histogram with respect to values of the component is formed and evaluated, wherein the formation of the histogram for the respective element of the hypothesis matrix takes place by classifying and totaling or totaling in a weighted manner the respective components of the correspondence hypotheses in a given histogram classification for all elements of the hypothesis matrix within an interior of the surroundings of the respective element, wherein when evaluating and forming the histograms, all elements of the hypothesis matrix are captured by the respective surroundings or by a respective window, which are: (i) identical or similar for all elements of the hypothesis matrix with respect to form and/or extent, and/or (ii) configured as sliding surroundings or as a sliding window.

3. The method as recited in claim 1, wherein when evaluating the histogram for the respective element of the hypothesis matrix on the basis of the histogram, an evaluation value is generated:
   by reading out one or multiple values of the histogram in at least one histogram interval for the correspondence hypothesis or of least one component thereof assigned to the given element and by totaling them or totaling them in a weighted manner to form the evaluation value, and
   based on one or multiple values from one or from multiple histogram interval adjacent to the assigned histogram interval or from the surroundings of adjacent histogram intervals.

4. The method as recited in claim 3, wherein when verifying a verification of the correspondence hypothesis for the respective element, the hypothesis matrix or a component thereof is identified, if the evaluation value at least reaches a local or global predefined threshold value.

5. The method as recited in claim 3, wherein when verifying the correspondence hypothesis to the respective element of the hypothesis matrix or of a component thereof, an assigned and verified correspondence or a component thereof is established in each case by an evaluation value and is entered as a corresponding element into the correspondence matrix.

6. The method as recited in claim 1, wherein a respectively instantaneously generated histogram, which is stored in a histogram memory is used for the parallel and/or serial verification of multiple correspondence hypotheses for accelerating and/or for reducing a processing effort of the evaluation of the hypothesis matrix and/or of the conditional verification of the correspondence hypotheses.

7. A method for evaluating images and for evaluating correspondence hypotheses of images, the method comprising the following steps:
   providing correspondence hypotheses between first and second images each given as a corresponding image matrix, in a corresponding hypothesis matrix;
   evaluating the hypothesis matrix and conditionally verifying the correspondence hypotheses; and
   providing verified image correspondence hypotheses as image correspondences in a correspondence matrix as a result of the evaluation, the evaluation of the hypothesis matrix being performed in that for each element as a reference element of the hypothesis matrix in surroundings of the reference element for at least one component of the correspondence hypotheses, a histogram with respect to values of the component is formed and evaluated, wherein a respectively instantaneously generated histogram, which is stored in a histogram memory is used for the parallel and/or serial verification of multiple correspondence hypotheses for accelerating and/or for reducing a processing effort of the evaluation of the hypothesis matrix and/or of the conditional verification of the correspondence hypotheses, wherein the histogram memory is organized in such a way that an underlying clock cycle is sufficient in order to read out the value for a respectively up-to-date element of the hypothesis matrix from the histogram, as well as values for one or for multiple additional intervals of the histogram, (i) an underlying read address being calculated by adding or subtracting a value of 1 with respect to the value for the up-to-date element stored in the hypothesis matrix and/or (ii) by clustering intervals of the histogram with respect to a dual port of the underlying histogram memory.

8. The method as recited in claim 1, wherein to accelerate the evaluation of the hypothesis matrix and/or of the conditional verification of the correspondence hypothesis:

the conditional verification is carried out in parallel and/or simultaneously for a plurality of correspondence hypotheses for a corresponding plurality of elements of the hypothesis matrix, and/or not all elements of the hypothesis matrix within an interior of the surroundings of the respective element and, of the underlying sliding window, are taken into consideration when updating the histogram, but at most a predefined number, a priority sequence as a function of the position in the window establishing in which sequence the elements of the hypothesis matrix within the interior of the surroundings of the respectively given element are primarily taken into consideration.

9. A driver assistance system for a vehicle, the driver assistance system configured to evaluate images and evaluate correspondence hypotheses of images, the driver assistance system configured to:

provide correspondence hypotheses between first and second images each given as a corresponding image matrix, in a corresponding hypothesis matrix;

evaluate the hypothesis matrix and conditionally verifying the correspondence hypotheses; and provide verified image correspondence hypotheses as image correspondences in a correspondence matrix as a result of the evaluation, the evaluation of the hypothesis matrix being performed in that for each element as a reference element of the hypothesis matrix in surroundings of the reference element for at least one component of the correspondence hypotheses, a histogram with respect to values of the component is formed and evaluated;

wherein a result of the evaluation is used to control operation of the vehicle, wherein the formation of the histogram for the respective element of the hypothesis matrix takes place by classifying and totaling or totaling in a weighted manner the respective components of the correspondence hypotheses in a given histogram classification for all elements of the hypothesis matrix within an interior of the surroundings of the respective element, and wherein when forming the respective histogram, the surroundings for the respective element of the hypothesis matrix are provided in each case with a window overlaying wholly or partially the hypothesis matrix in the manner of a rectangle, of a polygon, of an oval, of an ellipsis or of a circle.

10. A device for evaluating images for evaluating correspondence hypotheses of images, the device configured to:

provide correspondence hypotheses between first and second images each given as a corresponding image matrix, in a corresponding hypothesis matrix;

evaluate the hypothesis matrix and conditionally verifying the correspondence hypotheses; and provide verified image correspondence hypotheses as image correspondences in a correspondence matrix as a result of the evaluation, the evaluation of the hypothesis matrix being performed in that for each element as a reference element of the hypothesis matrix in surroundings of the reference element for at least one component of the correspondence hypotheses, a histogram with respect to values of the component is formed and evaluated;

wherein the device is an ASIC, or a freely programmable digital signal processing device, or a combination of the ASIC and the feely programmable digital signal processing device, wherein the formation of the histogram for the respective element of the hypothesis matrix takes place by classifying and totaling or totaling in a weighted manner the respective components of the correspondence hypotheses in a given histogram classification for all elements of the hypothesis matrix within an interior of the surroundings of the respective element, and wherein when forming the respective histogram, the surroundings for the respective element of the hypothesis matrix are provided in each case with a window overlaying wholly or partially the hypothesis matrix in the manner of a rectangle, of a polygon, of an oval, of an ellipsis or of a circle.

11. An operating device which is configured to be controlled during operation using a device for evaluating images for evaluating correspondence hypotheses of images, the device configured to:

provide correspondence hypotheses between first and second images each given as a corresponding image matrix, in a corresponding hypothesis matrix;

evaluate the hypothesis matrix and conditionally verifying the correspondence hypotheses; and provide verified image correspondence hypotheses as image correspondences in a correspondence matrix as a result of the evaluation, the evaluation of the hypothesis matrix being performed in that for each element as a reference element of the hypothesis matrix in surroundings of the reference element for at least one component of the correspondence hypotheses, a histogram with respect to values of the component is formed and evaluated;

wherein the device is an ASIC, or a freely programmable digital signal processing device, or a combination of the ASIC and the feely programmable digital signal processing device, wherein the formation of the histogram for the respective element of the hypothesis matrix takes place by classifying and totaling or totaling in a weighted manner the respective components of the correspondence hypotheses in a given histogram classification for all elements of the hypothesis matrix within an interior of the surroundings of the respective element, and wherein when forming the respective histogram, the surroundings for the respective element of the hypothesis matrix are provided in each case with a window overlaying wholly or partially the hypothesis matrix in the manner of a rectangle, of a polygon, of an oval, of an ellipsis or of a circle.

12. The operating device as recited in claim 11, wherein the operating device is a vehicle.

13. A non-transitory machine-readable memory medium on which is stored a computer program for evaluating images and for evaluating correspondence hypotheses of images, the computer program, when executed by a computer or a digital signal processing unit, causing the computer or the digital signal processing unit to perform the following steps:
   providing correspondence hypotheses between first and second images each given as a corresponding image matrix, in a corresponding hypothesis matrix;
   evaluating the hypothesis matrix and conditionally verifying the correspondence hypotheses; and
   providing verified image correspondence hypotheses as image correspondences in a correspondence matrix as a result of the evaluation, the evaluation of the hypothesis matrix being performed in that for each element as a reference element of the hypothesis matrix in surroundings of the reference element for at least one component of the correspondence hypotheses, a histogram with respect to values of the component is formed and evaluated,
wherein the formation of the histogram for the respective element of the hypothesis matrix takes place by classifying and totaling or totaling in a weighted manner the respective components of the correspondence hypotheses in a given histogram classification for all elements of the hypothesis matrix within an interior of the surroundings of the respective element, and
wherein when forming the respective histogram, the surroundings for the respective element of the hypothesis matrix are provided in each case with a window overlaying wholly or partially the hypothesis matrix in the manner of a rectangle, of a polygon, of an oval, of an ellipsis or of a circle.

* * * * *